Figure 1:
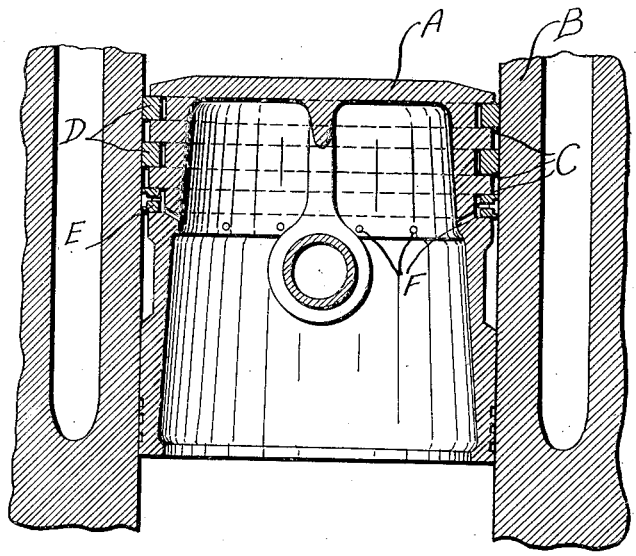

Nov. 17, 1931.                D. M. SMITH                1,832,795
                              PISTON RING
                           Filed Nov. 10, 1930

INVENTOR
Dallas M. Smith
By J. Henry Kinealy
ATTORNEY

Patented Nov. 17, 1931

1,832,795

UNITED STATES PATENT OFFICE

DALLAS M. SMITH, OF WEBSTER GROVES, MISSOURI, ASSIGNOR TO McQUAY-NORRIS MANUFACTURING COMPANY, OF ST. LOUIS, MISSOURI, A CORPORATION OF DELAWARE

PISTON RING

Application filed November 10, 1930. Serial No. 494,803.

My invention relates to piston rings and more particularly to piston rings for use in internal combustion engines the operation of which requires a substantially high unit radial pressure between the cylinder contacting face of the ring and the wall of the cylinder in which reciprocates the piston whereon the ring is used.

Some internal combustion engines because of designed characteristics require that the rings used therein have a unit radial pressure substantially higher than that developed in piston rings of conventional design. All piston rings comprising resilient split bands or piston rings otherwise rendered inherently elastic are springs and depend upon their inherent elastic deformation or reaction to produce them against the cylinder wall. The amount and strength of this reaction or deformation depends upon the material of which the ring is made. That is, if a comparatively strong material is used, the thickness of the ring and the amount of deflection can be great enough to produce very large stresses in the material, which stresses to a large degree account for large reactions and, in turn, produce what is known as ring stiffness or tension. Ring thicknesses and resultant deflections have been increased until a limit almost has been reached for materials generally used in the manufacture of piston rings. Cast-iron, the material in most common use, is not especially strong and in piston rings the maximum stress developed is approximately thirty-five thousand pounds per square inch transverse load. When the cylinder contacting face is substantially the width of the body of the piston ring and the ring is loaded to a stress of thirty-five thousand pounds per square inch the unit radial pressure developed on the contacting face of the ring and translated into pounds per square inch area thereof is approximately eighteen and one-half pounds per square inch and such a unit pressure is quite high and for ordinary purposes is considered sufficient.

However, as stated above, there is an increasing need under certain conditions for rings having higher unit radial pressures in order that the pressure against the cylinder wall developed in the ring will be sufficient to prevent the escape of gases under high pressure and to scrape from the cylinder wall oil that might otherwise reach the combustion chamber. Also, regardless of the radial pressure of the ring there is a tendency for oil to build up between the face of the ring and the cylinder wall in a surf-board action which carries the ring out of contact with the cylinder wall.

The objects of my invention are to provide a piston ring having a reduced cylinder contacting area without reducing the tension of the ring so that the unit radial pressures developed against the cylinder wall will be greatly increased without increasing the fibre stresses in the ring and, therefore, continuing to use the same materials that have been used in the past; and a further object of my invention is to prevent oil from building up between the face of the ring and the cylinder wall by forming passages extending through the ring inwardly from the face thereof.

The present invention described herein consists mainly in the provision of a ring having a plurality of cylinder contacting ribs preferably arranged with one rib positioned at each end face of the ring and with a groove between the ribs so that the unit radial pressure of the ribs against the cylinder wall will be increased, but the ribs will balance the ring against the cylinder wall in the same manner as if a comparatively broad cylinder contacting surface were provided. In addition I provide passages leading through the ring from the groove so that any oil collected in the groove will drain through the ring and an accumulation of oil to carry the ring out of contact with the cylinder wall will be prevented.

Figure 2:
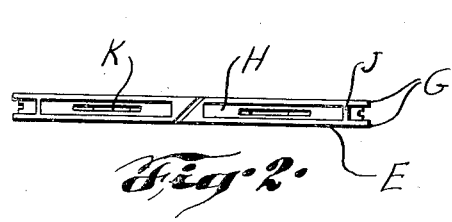
Figure 4:
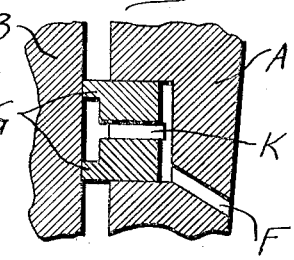
Figure 3:
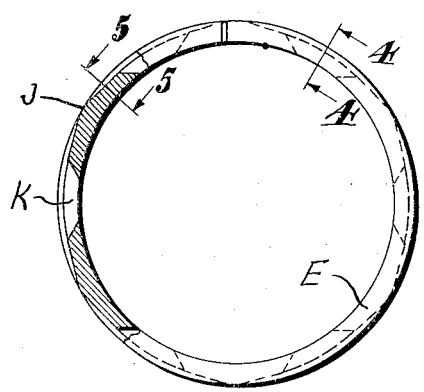
Figure 5:
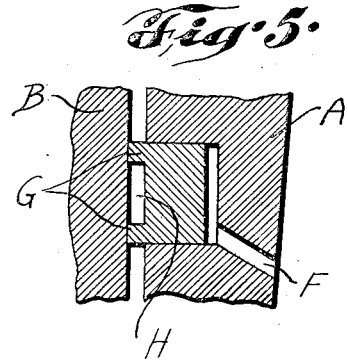

One form of piston ring embodying my invention is shown in the accompanying drawings wherein similar characters are used to designate similar parts; Fig. 1 is a sectional view of a cylinder and a piston grooved to receive piston rings; Fig. 2 is a view of the ring embodying my invention; Fig. 3 is a view from an end face of the ring partly in section; and Figs. 4 and 5 are sections of the ring along the lines 4—4 and 5—5, respectively, and with the ring inserted in a piston groove.

Referring to the figures the piston A is adapted to reciprocate in the cylinder B and has a plurality of ring grooves C in the uppermost of which are, preferably, mounted piston rings of conventional design as indicated at D, but in the lowermost of which is mounted a ring E embodying my invention. Also, I prefer that the lowermost groove C has a plurality of ports F leading inwardly therefrom to the interior of the piston, for the purpose more fully hereinafter described.

The piston ring E in the form shown in the figures comprises a resilient split band substantially rectangular in shape and has the cylinder contacting face thereof constituted by a pair of comparatively narrow circumscribing ribs G one of which is positioned at each end face of the ring. A series of grooves H are formed in the piston ring between the ribs G and in this embodiment of my invention the grooves terminate short of one another with resultant axially extending cylinder contacting bars J between adjacent ends of adjacent grooves. In any form of my invention I prefer that a groove H is comparatively wide as shown. The ring also has a plurality of passages which may be in the form of slots K extending through the ring and preferably of less length and width than the grooves H and arranged so that one of the slots leads from each groove to the rear face of the ring.

In operation and use on a piston the circumscribing ribs G will have a comparatively high unit radial pressure against the cylinder wall and the ribs may be as narrow as desired to obtain the necessary pressure without endangering perfect balance of the ring. The grooves H not only reduce the cylinder contacting area, but also collect any oil which might tend to accumulate between the ring and the cylinder wall and the oil thus collected will drain rearwardly from the grooves through the slots K and into the space behind the ring in the ring groove of the piston from where it may drain through the ports F to the crank case of the engine. If the ports F are inclined slightly downwardly as shown in the drawings the draining of the oil from the ring groove will be facilitated.

While the ring E embodying my invention may be placed anywhere on a piston I prefer that it be placed in the lowermost groove as outlined above because if so positioned no gases will find their way past the circumscribing ribs G into the groove H and through the slots K and ports F to the interior of the piston as might happen if the ring were placed in the top groove.

As stated above, I do not propose to limit myself to any one form of the various elements comprised in the ring because it is obvious that they may be changed in size, shape and arrangement without departing from the spirit of my invention as set forth in the claims included below.

What I claim as new and desire to secure by Letters Patent, is:—

1. A piston ring having the cylinder contacting face thereof constituted by a pair of comparatively narrow circumscribing ribs, said ring also having a series of comparatively wide grooves arranged peripherally thereof between said ribs and terminating short of one another with resultant axially extending cylinder contacting bars arranged between adjacent ends of adjacent grooves, and said ring having passages extending from said grooves rearwardly through said ring, each of said passages being of less length than the groove from which it extends, whereby the cylinder contacting area of said ring will be reduced without materially decreasing the total tension of said ring with a resultant increase of radial pressure per unit of remaining cylinder contacting area.

2. A piston ring comprising a resilient split band having the cylinder contacting face thereof constituted by a pair of comparatively narrow circumscribing ribs one of which is positioned at each end face of said ring, said ring also having a series of comparatively wide grooves arranged peripherally thereof between said ribs and terminating short of one another with resultant axially extending cylinder contacting bars arranged between adjacent ends of adjacent grooves, and said ring having an elongated slot extending from each of said grooves in said series rearwardly through said ring, each of said slots being of less length than the groove from which it extends, whereby the cylinder contacting area of said ring will be reduced without materially decreasing the total tension of said ring with a resultant increase of radial pressure per unit of the remaining cylinder contacting area.

3. A piston ring having the cylinder contacting face thereof constituted by a pair of comparatively narrow circumscribing ribs, said ring also having a series of comparatively wide grooves arranged peripherally thereof between said ribs and terminating short of one another with resultant axially extending cylinder contacting bars arranged between adjacent ends of adjacent grooves, said ring having an elongated slot extending from each of said grooves in said series rearwardly through said ring each of said slots being of less length and width than the groove from which it extends and being positioned substantially centrally axially and circumferentially thereof whereby the cylinder contacting area of said ring will be reduced without materially decreasing the total tension of said ring with a resultant increase of radial pressure.

In witness whereof I have signed my name to the foregoing specification.

DALLAS M. SMITH.